United States Patent [19]

Hashimoto

[11] Patent Number: 4,916,730

[45] Date of Patent: Apr. 10, 1990

[54] TELEPHONE ANSWERING DEVICE WITH AUTOMATIC TRANSLATING MACHINE

[75] Inventor: Kazuo Hashimoto, Tokyo, Japan

[73] Assignee: Hashimoto Corporation, Tokyo, Japan

[21] Appl. No.: 138,896

[22] Filed: Dec. 28, 1987

[30] Foreign Application Priority Data

Dec. 29, 1986 [JP] Japan ................................ 61-313325

[51] Int. Cl.<sup>4</sup> ............................................. H04M 1/65
[52] U.S. Cl. ....................................................... 379/70
[58] Field of Search ...................... 364/900, 513.5, 419; 379/67, 70, 74, 77, 84, 88; 381/42-43, 51-53

[56] References Cited

U.S. PATENT DOCUMENTS

| | | | |
|---|---|---|---|
| 4,415,766 | 11/1983 | Hyder | 178/30 |
| 4,430,726 | 2/1984 | Kasday | 364/900 |
| 4,435,617 | 3/1984 | Griggs | 381/44 |
| 4,488,005 | 12/1984 | Frantz | 379/88 |
| 4,502,128 | 2/1985 | Okajima et al. | 364/900 |
| 4,507,750 | 3/1985 | Frantz et al. | 364/900 |

Primary Examiner—Alan Faber
Assistant Examiner—James E. Tomassini
Attorney, Agent, or Firm—Lowe, Price, LeBlanc, Becker & Shur

[57] ABSTRACT

Since telephone answering systems have made great progress together with the telephone system and the market thereof has expanded, the calling party of any country all over the world does not always speak the same language as the outgoing message. Then the conventional telephone answering system wherein one foreign language is recorded on the incoming message tape cannot meet such a world-wide use. The present invention provides a telephone answering system, wherein a foreign language incoming message is recorded and then translated into the owner's own language by the translating device, so that the owner can get the translated message by the remote location. As it takes much time to translate the message correctly at the current technical level, simultaneous translation is not perfect. Thus, according to the present invention, the translation is completed by the translating device during a sufficient period of time after one message is stored in the telephone answering system and before the owner listens to it by the remote control, so that the translated message with good quality can be retrieved from the remote location.

4 Claims, 3 Drawing Sheets

TELEPHONE ANSWERING DEVICE WITH AUTOMATIC TRANSLATING MACHINE

BACKGROUND OFF THE INVENTION

The present invention relates to a telephone answering system with automatic translating device.

The telephone answering system has come into world-wide use as a very convenient personal communication system. However, there is an insufficiency in the conventional telephone answering system which is installed to answer an incoming call from every country and to record a caller's message, because there are many languages in the world and the caller doesn't always speak the same language as the outgoing message. So, the conventional telephone answering system has the limited use for world-wide user.

SUMMARY OF THE INVENTION

It is a first object of the present invention to provide a telephone answering system wherein it is possible to complete the translation before a user retrieves the message from remote location.

It is a second object of the present invention to translate and transmit the recorded message almost simultaneously to save time.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The arrangement and operations of the present invention will now be described.

Figure 1:
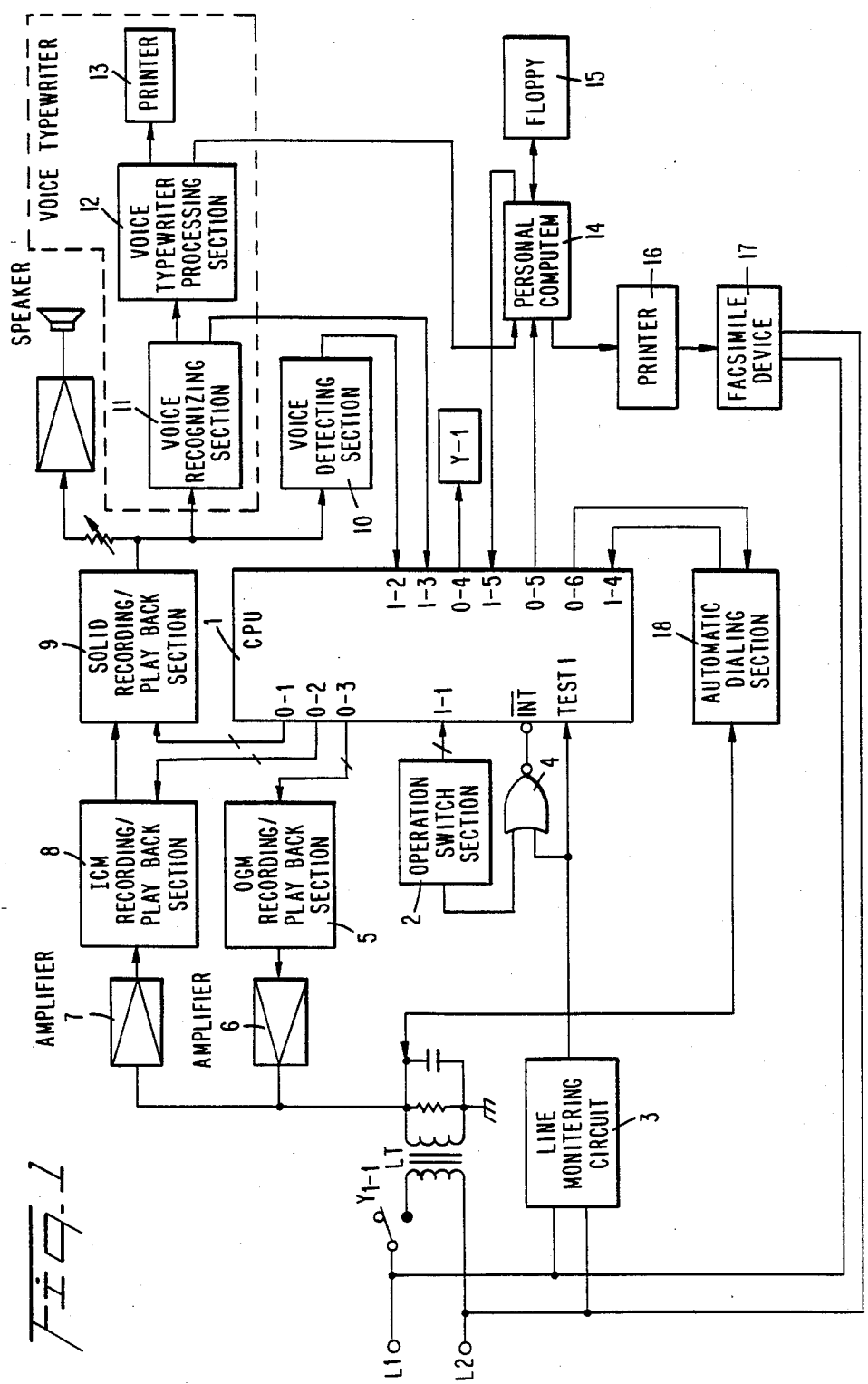
FIG. 1 is a block diagram which shows a principle of the present invention.

Referring to FIG. 1, reference numeral 1 denotes a one chip microprocessor (hereinafter referred to as CPU), wherein reference symbol INT denotes an interrupt terminal, 0-1 to 0-6 denote output terminals, 1-1 to 1-4 denote input terminals and TEST1 denotes an input terminal. Reference numeral 2 denotes an operation switch section including some operation keys, for instance, a recording and a playback key for an outgoing message (hereinafter referred to as OGM), a rewind and a playback key for an incoming message (hereinafter referred to as an ICM) from the calling party, and a key for setting the system in the automatic answering-/recording mode. Reference numeral 3 denotes a line monitoring circuit for detecting the on-hook by the calling party. Reference numeral 4 denotes a NOR gate for introducing the output of said operation switch section 2 and said line monitoring circuit 3 into the interrupt terminal INT of the CPU 1. Reference numeral 5 denotes an OGM recording/playback section, wherein a tape or a solid-state memory may be used. Reference numerals 6 and 7 denote amplifiers. Reference numeral 8 denotes an ICM recording/playback section, wherein a recording tape is used in the present embodiment so as to enable the long time recording. Reference numeral 9 denotes a solid-state recording/playback section. At the time of the automatic translation described later, each one message of the calling party is transmitted from the tape to said solid state recording/playback section. The calling party's message can be processed at a high speed for the automatic translation because a solid-state memory is used in said section 9. Reference numeral 10 denotes a voice detecting section, which detects pauses of the message that is played back from said solid state recording/playback section 9, and applies one phrase of said played back message to a voice recognizing section 11. When the voice recognition of one phrase is completed, next one phrase is to be applied. Reference numeral 12 denotes a typewriter processing section, which encodes one phrase that is voice recognized as described above into the predetermined code, and outputs said encoded phrase to a printer 13 and a personal computer 14. When the message is inputted to said solid-state recording/playback section 9, the personal computer 14, upon receiving a start signal through the output port 0-5 of the CPU-1, makes the automatic translation program loaded from a floppy disc 15. After it is checked what kind of language of the message according to said program, the code of one message is stored into a memory section (not shown) of said computer and then the automatic translation in said language is started. Reference numeral 16 denotes a printer which prints translated sentences on a cut paper. Reference numeral 17 denotes a facsimile device (hereinafter calls a FAX). It is arranged that sheets of the translated sentence that are printed out by the printer 16 are sent to a paper sending out section of said FAX. Reference numeral 18 denotes an automatic dialing section for sending out said sheet of the translated sentence as described above to a facsimile device of a predetermined person.

Figure 2:
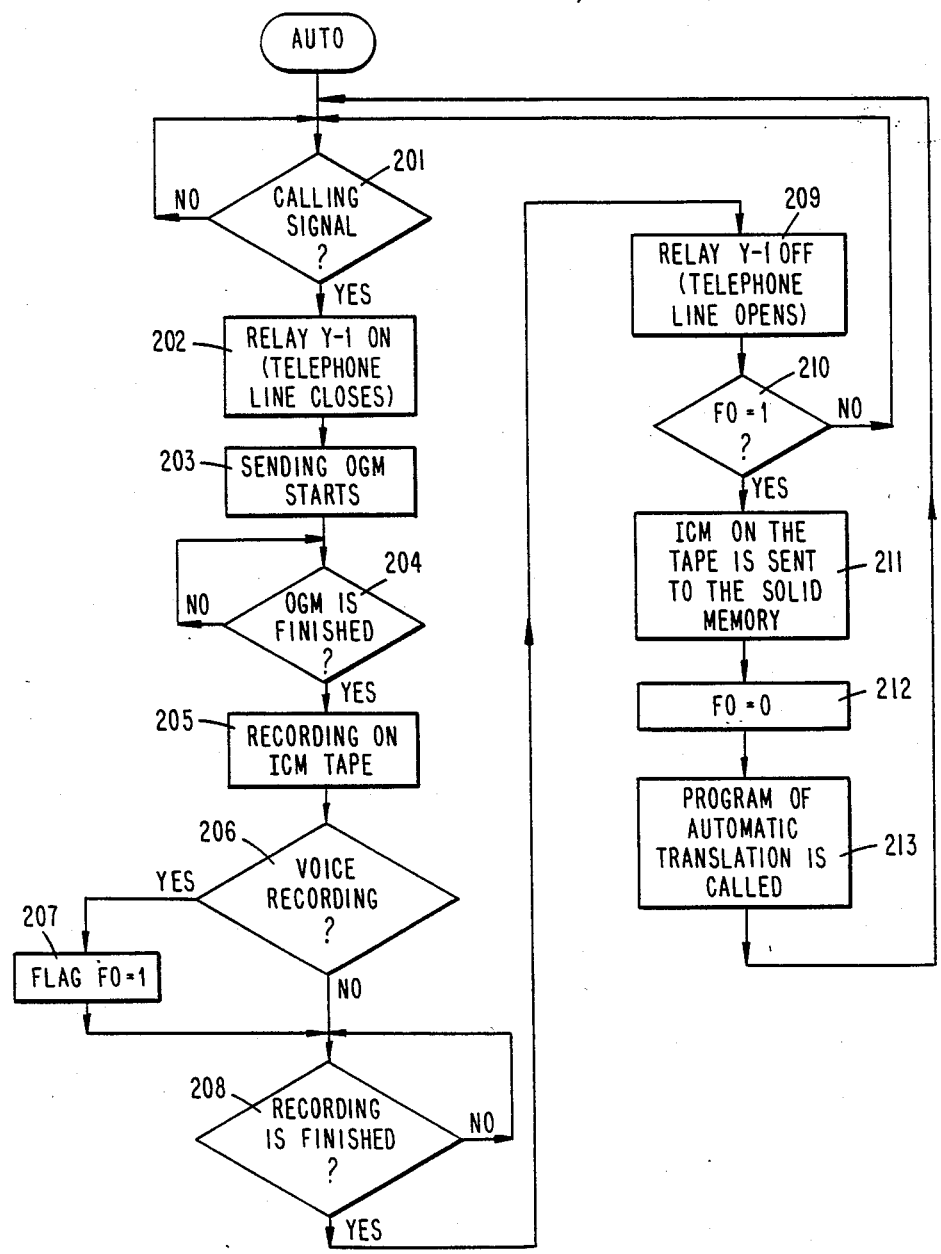
FIG. 2 is a flow chart which shows the operation of the telephone answering system at the time of receiving a call.

The detailed operation will now be described with reference to the flow charts of FIGS. 2 and 3.

When the ringing signal comes into telephone lines L1 and L2 in FIG. 1, said ringing signal is applied to the input terminal TEST1 of the CPU 1 through the line monitoring circuit 3. The TEST1 which is connected to a counter section incorporated in the CPU 1 counts AC waveforms of the ringing signal. When it is decided to be a ringing signal in step 201, in next step 202 a relay Y-1 is energized and the telephone lines are engaged. More particularly, as the relay Y-1 is energized through the output port 0-4 of the CPU 1 in FIG. 1, the telephone lines L1 and L2 are engaged by the contact y1-1 of the relay Y-1 through a line transformer IT. Accordingly, the ringing signal stops and the voice circuit is established.

Now the OGM recording/playback section 5 is driven in the playback mode by the command of the output port 0-3 and the sending of the OGM is started (step 203). In next step 204, it is checked whether or not the OGM is completed. When said checking results in YES, the program proceeds to step 205, wherein the recording of the ICM on an ICM tape (not shown) of the ICM recording/playback section 8 is started.

In step 206, it is checked whether or not the calling party's voice has really recorded in above recording mode. It will be a waste of much time if the automatic translation program described later is operated even when the voice has not been recorded. So it is checked in this step whether or not the voice has been recorded, and the automatic translation program described later ;is called only when the voice has been recorded. When the voice has been recorded, the program proceeds to t step 207. A flag, for instance, flag OF is set to "1" and then the program proceeds to next step 208.

When the recording is completed, said relay Y-1 is deenergized and the telephone lines are disengaged (step 209). In next step 210, said flag OF is checked. When the flag OF is "1" as described above, the program proceeds to step 211. Said message of one incoming call is rewound, played back, and transmitted to the solid-state recording/playback section. The reason why the message is transmitted to the solid-state memory will be described later.

In next step 212, said flag OF is cleared. And then the automatic translation program is called (step 213). After a predetermined process shown in FIG. 3 described later is carried out, the program returns to step 201 wherein the system returns to the standby mode to be ready for an incoming ringing signal. Or, if it is arranged to supply the interrupt upon receiving the incoming ringing signal and to jump to the step 201, it is possible to answer the incoming call from the calling party and record the ICM even during the automatic translation described later, because the OGM recording/playback section and the ICM recording/playback section are not used during the automatic translation.

And further, the automatic translation takes much time. So if more than two ICMs are recorded during the automatic translation of one ICM, the tape position of each ICM is stored into, for instance, a memory of the CPU 1. And when the automatic translation of one ICM is completed, the ICM tape is rewound to the beginning position of next ICM to be translated, and then said ICM is played back. When said playback is completed, said ICM tape is fast forwarded to reach the ending position of the last recorded ICM, ready for an ICM which will be next recorded. It is arranged that the output of the line monitoring circuit 3 in FIG. 1 can be introduced into the interrupt terminal $\overline{\text{INT}}$ of the CPU 1 through the NOR gate 4 in series with the input terminal TEST1 of the CPU 1 in order to supply above interrupt.

Figure 3:
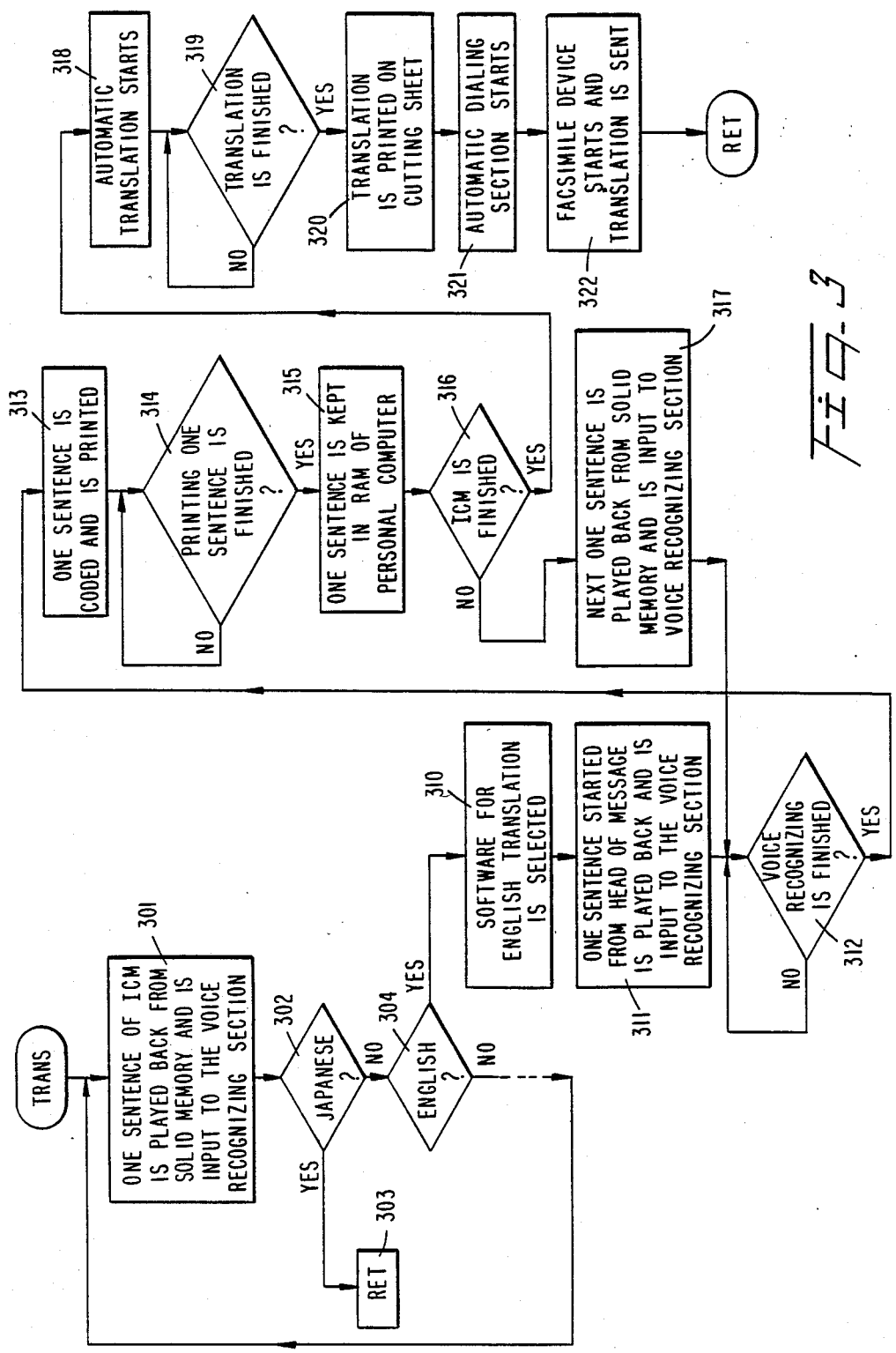
FIG. 3 is a flow chart at the time of the automatic translating operation.

Now, referring to FIG. 3, flow chart of the automatic translation, in step 301, one phrase of one ICM which has been transmitted to the solid-state recording section 9 as described above is played back and inputted into the voice recognizing section11. In this case one phrase means a short sentence between pauses detected by the voice detecting section 10. As the voice recognizing section is not capable of recognizing the long sentence, each phrase of the ICM is sent to the voice recognizing section one by one. In step 302, it is checked whether or not said one phrase is Japanese. More particularly, some characteristics in Japanese sentence are checked, for instance, whether "desu", an ending word frequently spoke in Japanese is detected or not is checked. Even in case of a Japanese ICM, when said characteristics are not detected, the program returns to step 301 through a step 304, and next one phrase is taken out by the command through the output port $-1$ of the CPU 1 to repeat above operation. When it is decided to be Japanese, the translation is not needed, so that program proceeds to step 303 from step 302 and goes out from this routine.

In case of an English ICM, in step 304, it is checked whether or not a characteristic in English sentence, "I am" and other several characteristics are detected. When it is decided to be English, the program proceeds to step 310. If another language is necessary, the program thereof may be inserted after NO of step 304. Now, in step 310, the translation program for English is loaded from the floppy disc 15 to the personal computer 14. As the program for deciding what language of the message has been loaded in the personal computer 14, said command is given to the floppy 15 by the personal computer 14.

In step 311, the address of the solid-state recording/playback section 9 is initialized, and one phrase from the beginning of the ICM is played back and inputted into the voice recognizing section 11. When said voice recognition is completed (step 312), said one phrase is transformed into a predetermined code, for instance, ASCII by the voice typewriter processing section 12 and said original code is printed out by the printer 13 (step 313). When said printout of one phrase is completed, said coded one phrase is stored into a memory RAM of the personal computer 14 (steps 314 and 315).

In next step 316, it is checked whether or not above process of every ICM is completed. If not, in step 317 next one phrase is played back from the solid-state memory to repeat above process. When above process of every ICM is completed, the program proceeds to step 318 and the automatic translation is started. When the translation is completed, the translated sentences are printed out on the cut sheet by using the printer 16 (steps 319 and 320). It is arranged that said printed cut sheet is provided to the paper sending out section of the FAX 17. Then the automatic dialing section 18 is operated (step 321) and the translated sentences are transmitted out to the predetermined person (step 322). If said transmission is not necessary, the translated sentences are stored into the printer 16.

As described above, according to the present invention, it is possible to translate the foreign language's ICM recorded on the telephone answering system, without using the imperfect instant translation mechanism, during sufficient period of time before the owner listens to said ICM remotely, or manually the following morning, and to print out the translated ICM for transmitting to the owner, if necessary. Therefore, the present invention is much advantageous in practical use.

Although a certain preferred embodiment has been shown and described, it should be understood that many changes and modifications may be made therein without departing from the scope of the invention.

What is claimed is:

1. A telephone answering system with automatic translating device, comprising:
    means for recording an incoming message after an outgoing message is sent out in response to an incoming call;
    means for transferring, successively, portions of the recorded incoming message to a solid-state memory after the recording by said incoming message recording means for a predetermined period of time;
    means for determining the kind of language of the message being transferred to the solid-state memory;
    means for introducing said message into a voice recognizing means;

means for detecting pauses of phrases during said introduction into the voice recognizing means, to distinguish each one phrase of the message by the translating device;

means for reading out a corresponding language's translation program from a memorizing medium and entering it into a computer after said recognition of language;

means for resetting an address of said solid-state memory, and entering said each phrase one by one into the translating device by playing back the message from the beginning; and means for returning the system to the standby mode after said translation is completed.

2. A method of operating a telephone answering system having an automatic translating device, comprising the steps of:

in response to an incoming call, establishing a loop circuit;

recording an incoming message after sending on the loop circuit an outgoing message in response to the incoming call;

storing successive portions of the incoming message in a solid state memory device;

determining the language of the message being stored in the solid state memory device;

detecting pauses of phrases in said incoming message to determine each one phrase of the message from another one phrase thereof;

translating said incoming message stored in said solid state memory device, phrase-by-phrase, if the language of the incoming message is determined during the determining step to be other than a native language; and returning said system to a standby mode after said incoming message is translated.

3. A method of operating a telephone answering system of claim 2, which includes automatically transmitting the foreign language translation of the incoming message via a facsimile device to the called party.

4. A method of operating a telephone answering system of claim 2, which includes automatically printing the foreign language translation of the incoming message.

* * * * *